United States Patent Office 3,499,960
Patented Mar. 10, 1970

3,499,960
PALATABLE COATED PARTICLES OF AN ANION EXCHANGE RESIN
Thomas J. Macek, Jenkintown, Clyde E. Shoop, Lansdale, and Dennis R. Stauffer, Prospectville, Pa., assignors to Merck & Co., Inc., Rahway, N.J., a corporation of New Jersey
No Drawing. Filed Jan. 25, 1965, Ser. No. 427,930
Int. Cl. A61k 27/00
U.S. Cl. 424—33         2 Claims

ABSTRACT OF THE DISCLOSURE

The gritty, astringent taste of a polystyrene-divinylbenzene copolymer anion exchange resin to be swallowed in finely divided form is overcome by coating the particles with an acrylic polymer cross-linked with allylsucrose.

---

This invention relates to compositions useful for the treatment of hypercholesteremia and biliary cirrhosis.

More specifically, the present invention relates to an improved hypocholesteremic agent comprising a low cross-linked styrene-divinylbenzene quaternary ammonium type copolymer of less than 100 mesh, a minimum ability to bind glycocholic acid and a minimum hygroscopy, coated with colloidal carboxy polymethylene cross-linked with a polyallyl sucrose.

High blood cholesterol level, which is also known as hypercholesteremia, is believed to be responsible in many cases for atherosclerosis. Accordingly, it is exceedingly desirable to effect a reduction of the blood cholesterol level is atherosclerosis patients. This has been done heretofore primarily through the use of low fat diets. However, in many patients this is not sufficient to maintain the cholesterol level within desired limits. Accordingly it is also desirable to administer to the patient a hypocholesteremic agent.

Pruritis, or severe itching, especially at the anus, is a major complaint of persons suffering from interference with normal excretion of bile, as in biliary cirrhosis or other forms of bile stasis. This can be so severe that patients are known to contemplate suicide. Until recently, the control of such pruritis has been unsatisfactory, being principally surgical biliary drainage.

It has now been found that dramatic reduction of the itching associated with bile stasis occurs when the bile acids in the gut are bound by the use of polystyrene-divinylbenene resins as described herein. Further, there is no rise in serum bilirubin nor any adverse effect of the treatment on liver function as measured by standard tests. The morale of patients is strikingly enhanced. In certain cases, where the cause of biliary stasis is a blocking of the bile duct, the binding of bile acids in the gut has no effect.

Ability to remove glycocholic acid from aqueous solutions in vitro is a good test of the polystyrene-divinylbenzene polymers useful in the present invention. All polymers which have been found effective in binding bile acids in vivo are capable of removing glycocholic acid from aqueous solutions in vitro. Polymers which do not remove glycocholic acid from aqueous solution are ineffective in vivo. The effective resins bind at least 30% of the glycocoholic acid within 5 minutes when a solution of sodium glycoholate is exposed to an equal weight of resin. Glycocholic acid is removed by removal as a precipitate. The effective insoluble anion exchange resins remove glycocholic acid as a precipitate, presumably the glycocholate form of the resin.

The surprising correlation between glycocoholic acid-binding power in vitro, binding of bile acids in vivo, and the ability to reduce cholesterol blood levels in man and other animals apparently can be explained by the fact that the system maintains a substantially constant bile acid level in spite of the administration of a material which effectively removes bile acids from the system. Administration of a polymer according to this invention probably prevents bile acid readsorption in vivo. Cholesterol is oxidized to bile acids so as to maintain a substantially constant bile acid level, resulting in a lowered cholesterol blood level. This is considered the most probable explanation of the action of polymers administered according to this invention, although we do not wish to be bound by any theory by way of explanation.

Why the binding of bile acids in the gut should prove to be such a competent answer to pruritis is not completely understood since attempts to correlate the presence of pruritis with the degree of retention of bile acids in the gut has given equivocable results in the past. A rough correlation exists, however, between serum bile acids levels and the presence or absence of pruritis.

Polystyrene divinylbenzene polymers having a molecular weight of about 3,000 or higher are preferred in vivo bile acid binding agents. These materials are not absorbed in the alimentary tract and therefore do not cause toxic effects. In determining the polymeric amines to use, the important property is their hygroscopy. Peculiarly, only those polymers which, after equilibration with air at 100% relative humidity, have a water content greater than 65% are operable in effectively binding bile acids in the gut. Why this hygroscopy should correlate with the ability to bind bile acids is not clear but experimentally it does, just as the binding power correlates with reduction of blood cholesterol and relief of pruritis.

One class of resins effective against hypercholesteremia and pruritis is the "Dowex 1" resins, which are polystyrene resins cross-linked with varying percentages of divinyl benzene, made by Dow Chemical Co., Midland, Mich. Quaternary ammonium groups are introduced into such resins by chlormethylation of the aromatic rings and replacement of the chlorine by a tertiary amine such as trimethyl amine to form, e.g., a trimethyl ammonium group. These quaternary ammonium resins are useful in the form of a non-toxic salt, such as the chloride, sulfate, acetate, phosphate, or the like, or in the hydroxyl form. Any of the "Dowex 1" series resins which contain 5% or less of divinyl benzene, as for example "Dowex 1×1," "Dowex 1×2" and "Dowex 1×4," which contain 1%, 2% and 4%, respectively, of divinyl benzene, are useful. The efficacy in bile acid binding decreases as the percentage of cross-linking agent increases. Cross-linkage in excess of about 5% seriously impairs the efficacy of these resins. These resins can be made as described in United States Patent 2,591,573. Other insoluble amine salt type resins which are cross-linked to only a limited degree are also useful in cholesterol blood level reduction. The above resins can be further modified in a number of ways. The quaternizing tertiary amine which is reacted with the chlormethyl group can be any other tertiary amine or cyclic tertiary amine such as dimethylamine ethanol, pyridine, picoline, etc. The extent of chlormethylation can be varied so that the number of active quaternary ammonium groups per chain is varied. Activity is observed with as low as 40% of the theoretically possible active sites. The aromatic ring can have other substituents such as chlorine or methyl.

In addition to the above characteristics, it is preferred that the polystyrene-divinylbenzene copolymers used in this invention have a particle size less than 100 mesh (American standard sieve). Large particles cannot be adequately coated.

Hypocholesteremic resins, coated with carboxypolymethylene cross-linked with a polyallyl sucrose, according to the present invention, are preferred to the uncoated resins because of greater palatability. The uncoated resins are gritty and therefore unpleasant to take. A further disadvantage of the uncoated resins is an unpleasant odor, which is due to quaternary ammonium groups. The coated resins of this invention, on the other hand, are substantially odorless and do not cause the unpleasant sensations such as choking which are attributable to the uncoated material.

A typical coating agent is "Carbopol 934" which is a finely-divided synthetic hydrophilic colloid of an acrylic acid polymer cross-linked with polyallylsucrose in the form of a white, free-flowing powder having a bulk density of 13 lbs. per cubic foot and a pH in 1% aqueous solution of 3. This material disperses readily in water to yield a solution of low viscosity, which is transformed into a clear, stable gel on neutralization. Other carboxy polymethylenes may be used in lieu of this material.

In preparing compositions of the present invention, it is desirable to add an alkaline material such as sodium hydroxide to establish a substantially neutral pH. The minimum quantity of polyacrylic acid polymer which will effectively coat a polystyrene-divinylbenezne copolymer is 0.03 part per part of anhydrous polystyrene polymer. While there is no maximum limit as to how much can be used, as a practical matter it is found that when there is used 0.08 part of the sodium salt per part of polystyrene resin, the resulting suspension is quite viscous and difficult to work with.

The formulation of this invention may also be made by alternate methods wherein the addition of sodium hydroxide or water becomes unnecessary. The composition accordingly may be made by dry mixing all of the ingredients in a mechanical mixer followed by milling or screening so that the final product conforms to a #100 mesh powder or finer. In such cases the Carbopol 934 sodium salt is prepared separately by dissolving 8 parts of sodium hydroxide pellets and 72 parts of anhydrous methanol, and this solution is added to 20 parts of Carbopol 934 with agitation. The Carbopol 934 sodium salt which is formed is filtered, dried, and then reduced to a #100 to #200 mesh powder by milling.

Other ingredients which may be incorporated in compositions of this invention include bulk-forming ingredients such as "Methocel" (having a viscosity in the range of about 15 to about 4,000 cps.), which is useful in overcoming the tendency of the resin to cause constipation. Sodium alginate such as the commercial preparations sold as "Kelcosol" may be added to improve the dispersing of the ingredients. The formulations of this invention are made by mixing the ingredients in aqueous solution and removing the water by a conventional method such as drying. Flavoring, coloring, and sweetening agents can be added to the compositions of this invention as desired.

This invention will now be described with reference to specific embodiments as illustrated in the following examples:

EXAMPLE 1

Three formulations, designated as A, B and C, and having the compositions indicated in Table 1 below were prepared:

TABLE 1

|  | A | B | C |
|---|---|---|---|
| Dowex 1 x 2 (75% moisture), gm | 80 | 80 | 80 |
| Carbopol 934,[1] gm | 0.1 | 0.3 | 0.4 |
| Sodium hydroxide, to pH 7 distilled water, to ml | 100 | 100 | 100 |

[1] Carboxy polymethylene cross-linked with polyallylsucrose (B. F. Goodrich & Co.).

The "Carbopol 934" was dispersed in about 50 ml. of water with agitation. The "Dowex" resin was suspended with agitation. Aqueous sodium hydroxide was added to raise the pH to 7. At this point the "Carbopol" formed a gel. Additional water to a volume of 100 ml. was added to increase fluidity. The gelled suspension was poured on stainless steel pans and oven dried at 50° C. Formulation A had a slightly gritty feel in the mouth. Formulations B and C were non-gritty.

EXAMPLE 2

A formulation having the following composition was prepared:

|  | G. |
|---|---|
| "Dowex 1×2" (75% moisture) | 2,000 |
| "Carbopol 934" | 15 |
| "Methocel" (4,000 cps.) | 50 |
| Sodium hydroxide (to pH 7) | 6 |
| Total dry weight | 2,071 |

The above formulation contains 10 g. of "Dowex 1×2" on the anhydrous basis, which is approximately a daily dosage in 11.42 g. of composition.

The above formulation is made by adding the Methocel to 1 liter of hot water with agitation, followed by cooling. The "Carbopol 934" was separately dispersed in 1 liter of water. The two dispersions were mixed and an additional liter of water was added. The "Dowex 1×2" was suspended in the liquid medium, and the sodium hydroxide, dissolved in 252 ml. of water, was added. This brought the total liquid volume to 3.25 liters. The suspension was stirred until it had gelled. The gel was poured on stainless steel trays, dried at 120° F., and milled to an 80-mesh powder.

EXAMPLE 3

A formulation having the following composition was prepared:

|  | G. |
|---|---|
| "Dowex 1×2" (wet-screen 200-mesh, 75% moisture) | 663 |
| "Carbopol 934" | 6 |
| "Methocel" (15 cps.) | 20 |
| Sodium hydroxide (to pH 7) | 2.4 |
| Sodium alginate ("Kelcosol") | 12 |
| Total batch weight | 703.4 |

The "Carbopol 934" was dissolved in 500 ml. of water and mixed. The "Methocel" was added to 500 ml. of hot water, mixed, and cooled to room temperature. The "Carbopol 934" and "Methocel" dispersions were then mixed. The "Dowex" resin was added and mixed, and the sodium hydroxide in aqueous solution was added to raise the pH to 7. This caused gelling. The gel was poured into stainless steel trays, dried at 50° C., and milled to 80 mesh. The "Kelcosol" was added to the dried powder. Each 12 g. (approximately three teaspoonsful) of this powder contains 10 g. of "Dowex 1×2" on the anhydrous basis which is approximately a daily dosage. The composition can be mixed with liquids to obtain a palatable suspension form for administration.

EXAMPLE 4

A formulation made by dry mixing all ingredients was prepared as follows:

|  | Kg. |
|---|---|
| "Dowex 1×2" (dried to approx. 10% moisture) anhydrous 3.33 | 3.70 |
| "Carbopol 934" sodium salt | 0.14 |
| Sodium alginate "Kelcosol" | 0.10 |
| Cerelose (sweetening agent) | 0.06 |
| Total batch weight | 4.00 |

All of the ingredients were blended in a mechanical mixer and next passed through a comminuting mill to obtain #100 mesh powder or finer. Each 12 gm. (approximately 3 teaspoonfuls) of this powder contained 10 gm. of "Dowex 1×2" (anhydrous bases), or a daily dose of the resin. This powder composition can be mixed with liquids or juices to obtain a palatable suspension for oral administration to patients.

It should be noted that the coating of the resin takes place with "Carbopol 934" sodium salt during the course of the preparation of the suspension prior to oral administration. The resulting suspension accordingly is free of the usual gritty taste of "Dowex 1×2" and is palatable to the patient.

We claim:

1. A palatable pharmaceutical composition for binding bile acids in vivo comprising finely-divided particles of low cross-linked polystyrene-divinylbenzene copolymer anion exchange resin containing quaternary ammonium groups, the said particles being less than 100-mesh, the said resin having a molecular weight greater than 3,000, the property of binding at least 30% of the available glycocholic acid when exposed to an equal weight of said acid, and having a moisture content greater than 68% after equilibration with air at 100% humidity, the said particles being coated with at least 0.03 to about 0.08 parts by weight, per part of said resin, of the sodium salt of an acrylic polymer cross-linked by less than 3% allyl-sucrose.

2. The composition of claim 1 in which said resin has approximately 2% divinylbenzene.

References Cited

UNITED STATES PATENTS

| 2,912,358 | 11/1959 | Staib | 167—55 |
| 3,138,525 | 6/1964 | Koff | 167—55 |
| 3,074,852 | 1/1963 | Mayron | 167—82 |
| 3,091,574 | 5/1963 | Coletta | 167—82 |

FOREIGN PATENTS 661,334  4/1963  Canada.

ALBERT T. MEYERS, Primary Examiner

A. P. FAGESLON, Assistant Examiner

U.S. Cl. X.R.

424—34, 35, 79